United States Patent [19]

Wada et al.

[11] Patent Number: 5,523,811
[45] Date of Patent: Jun. 4, 1996

[54] CAMERA DEVICE FOR MOVING BODY

[75] Inventors: Hiroyuki Wada; Takashi Kawabata, both of Yokohama; Koichi Ohmori, Yokosuka; Shigeru Ogino, Tokyo; Hideyuki Arai, Kawasaki; Masaki Higashihara, Yokohama; Katsumi Azusawa, Konosu, all of Japan

[73] Assignee: Canon Kabushiki Kaisha, Tokyo, Japan

[21] Appl. No.: 419,761

[22] Filed: Apr. 10, 1995

Related U.S. Application Data

[63] Continuation of Ser. No. 46,186, Apr. 14, 1993, abandoned.

[30] Foreign Application Priority Data

Apr. 17, 1992 [JP] Japan .................................. 4-098033
Apr. 17, 1992 [JP] Japan .................................. 4-098197

[51] Int. Cl.⁶ .................................................. G03B 29/00
[52] U.S. Cl. .............................. 354/76; 348/118; 359/555
[58] Field of Search ............................ 348/118–120, 208; 354/75, 76, 405, 70, 430; 359/555

[56] References Cited

U.S. PATENT DOCUMENTS

| | | | |
|---|---|---|---|
| 3,689,695 | 9/1972 | Rosenfield et al. ................. | 354/81 X |
| 4,420,238 | 12/1983 | Felix ................................... | 354/81 |
| 4,881,800 | 11/1989 | Fuchs et al. ....................... | 359/555 |
| 4,910,591 | 3/1990 | Petrossian et al. ................. | 354/81 X |
| 4,911,545 | 3/1990 | Miller ................................. | 350/604 |
| 5,027,200 | 6/1991 | Petrossian et al. ................. | 354/81 X |
| 5,121,200 | 6/1992 | Choi ................................... | 354/81 X |
| 5,170,255 | 12/1992 | Yamada et al. .................... | 354/430 X |
| 5,175,580 | 12/1992 | Shiomi ............................... | 354/430 X |
| 5,198,856 | 3/1993 | Odaka et al. ...................... | 354/430 |
| 5,289,321 | 2/1994 | Secor .................................. | 354/81 X |

FOREIGN PATENT DOCUMENTS

| | | |
|---|---|---|
| 57-57760 | 12/1982 | Japan . |
| 59-127200 | 6/1984 | Japan . |
| 62-95698 | 5/1987 | Japan . |
| 1265400 | 10/1989 | Japan . |

*Primary Examiner*—David M. Gray
*Attorney, Agent, or Firm*—Fitzpatrick, Cella, Harper & Scinto

[57] ABSTRACT

Camera apparatus for use with an automotive vehicle having a rear view mirror. The rear view mirror comprises a half-mirror, light reflected therefrom being visible to an occupant of the vehicle. A lens is disposed adjacent to the half-mirror and receives light passing through the half-mirror. An image pickup device is optically coupled to the lens and receives light passing therethrough to form an image signal corresponding to the received light.

36 Claims, 11 Drawing Sheets

CAMERA DEVICE FOR MOVING BODY

This application is a continuation of application Ser. No. 08/046,186 filed Apr. 14, 1993, now abandoned.

BACKGROUND OF THE INVENTION

1. Field of the Invention

The present invention relates to a camera device for a moving body such as a vehicle.

2. Related Background Art

In order to improve safety upon travelling of a vehicle, some devices, in which an image pick-up means such as a television camera is mounted on a vehicle to pick up images in the fields before and behind the vehicle, and various kinds of information included in the picked-up images are extracted and utilized, have been proposed.

For example, Japanese Patent Publication No. 57-57760 proposes a system, which detects image series motions, i.e., the movement of the vehicle, from the fetched image signals by an optical correlation system, and generates an alarm to a driver on the basis of the distances to and the speeds of surrounding vehicles.

Japanese Laid-Open Patent Application No. 1-265400 proposes a system for searching a predetermined position of a picked-up and recognized image with respect to a "road region" so as to recognize signs. In addition, many associated systems (e.g., Japanese Laid-Open Patent Application Nos. 59-127200, 62-95698, and the like) have been proposed.

In the above-mentioned prior art, the camera used in an image pick-up operation is arranged at a position allowing a clear front view, e.g., in a passenger room such as "a position behind a windshield of a vehicle, which position is protected from climatic effects" or "a position on the rear surface of a rear-view mirror", or in a hood of a vehicle (near a headlight).

However, the camera arranged in the passenger room may deteriorate from an outer appearance or from driving comfort, or may narrow the field of view of a driver. Also, the camera arranged in the hood suffers from very bad environmental conditions, and may malfunction.

When the camera is arranged on the outer surface of a vehicle, e.g., on the side surface of a door or on the hood, adverse effects in various respects such as safety, design, aerodynamics, and the like may be expected.

SUMMARY OF THE INVENTION

One aspect of the present invention is to provide a camera device, which comprises a mirror device constituted by a half mirror, and an image pick-up means for receiving light transmitted through the half mirror, and can monitor an area around a moving body.

DETAILED DESCRIPTION OF THE PREFERRED EMBODIMENTS

Figure 1:
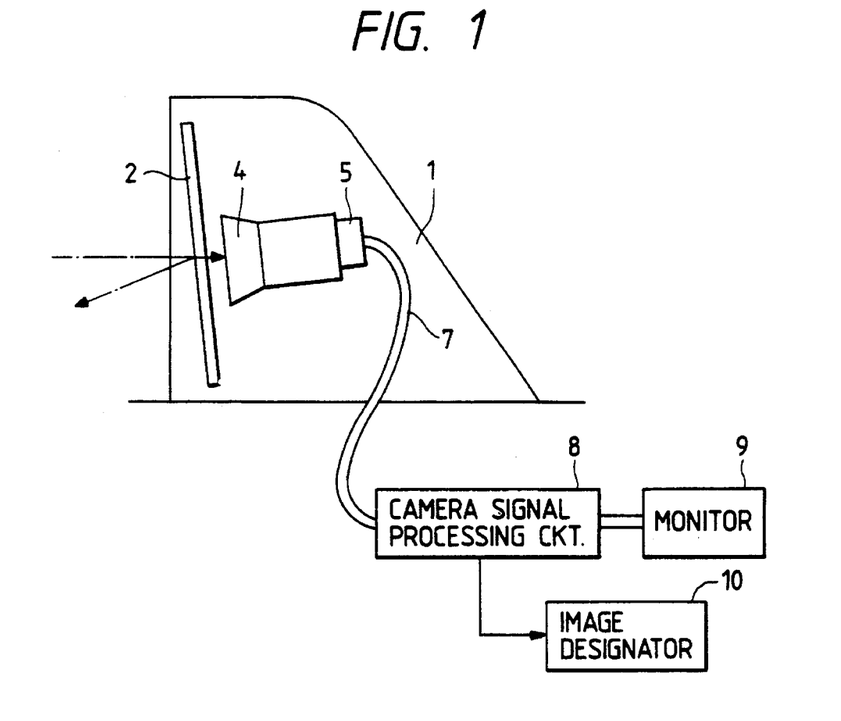
FIG. 1 is a schematic diagram showing an on-board monitor camera device according to the first embodiment of the present invention.

FIG. 1 is a schematic diagram showing an on-board monitor camera device according to the first embodiment of the present invention.

Figure 7:
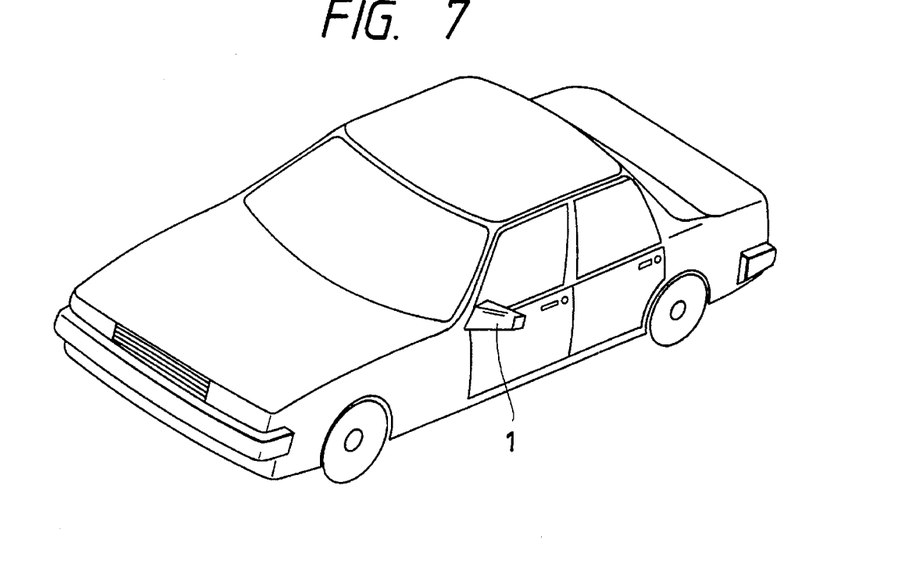
FIG. 7 is a perspective view showing the outer appearance of the first embodiment of the present invention.

In this embodiment, a camera is built in a door mirror 1, which is arranged to project outwardly from a door of a vehicle (see FIG. 7). The camera is constituted by a lens 4 and an image pick-up element 5 such as a CCD. An optical filter such as an infrared ray cut filter is provided to the lens 4.

The door mirror 1 has a hollow case, and a mirror 2 for confirming a rear view is constituted by a half mirror. The camera (constituted by the lens 4 and the image pick-up element 5) arranged in the case picks up an image, e.g., behind a vehicle through the half mirror 2.

The on-board monitor camera device of this embodiment with the above arrangement may be arranged in one or both of the door mirrors provided at the two sides of the vehicle. For example, a driver can monitor areas at the two sides of the vehicle by images formed on the half mirrors 2, and the image transmitted through each half mirror 2 is picked up by the image pick-up element 5 via the lens 4.

The image picked up by the image pick-up element 5 is photoelectrically converted into an electrical signal, and the electrical signal is input to a camera signal processing circuit 8 via a cable 7. The camera signal processing circuit 8 executes processing such as Y/C separation, γ correction, and the like, and the processed image is visualized on a monitor 9 arranged in a passenger room. Thus, when the monitor 9 is arranged at an easy-to-see position by a driver or a passenger, he or she can easily monitor side rear areas of the vehicle. In addition, when a signal from the camera signal processing circuit is supplied to an image designator 10, various operations described in the paragraphs of the prior art can be performed.

Figure 2:
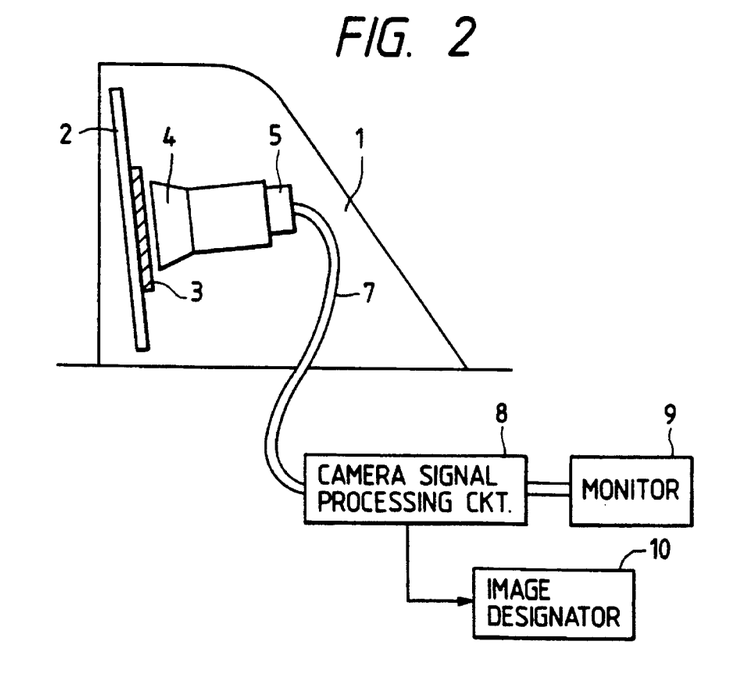
FIG. 2 is a schematic diagram showing an on-board monitor camera device according to the second embodiment of the present invention.

FIG. 2 shows the second embodiment of the present invention.

In the first embodiment shown in FIG. 1, the optical filter is provided to the lens 4. However, in this embodiment, an optical filter 3 is arranged on the inner surface of the half mirror 2 in place of being arranged on the lens 4.

More specifically, in a normal video lens, an optical filter is arranged in front of an image pick-up element. In this embodiment, the optical filter 3 is arranged integrally with the half mirror 2 so as to achieve a further compact structure. As the optical filter, two kinds of filters, i.e., an infrared ray cut filter and a low-pass filter, are normally used. In order to integrally arrange these filters on the half mirror 2, the two filters may be adhered by deposition, or a quartz film or the like may be adhered using an adhesive.

When the camera is used for monitoring using infrared rays, the optical filter adopts a visual light cut filter and an infrared ray transmission filter.

Figure 3:
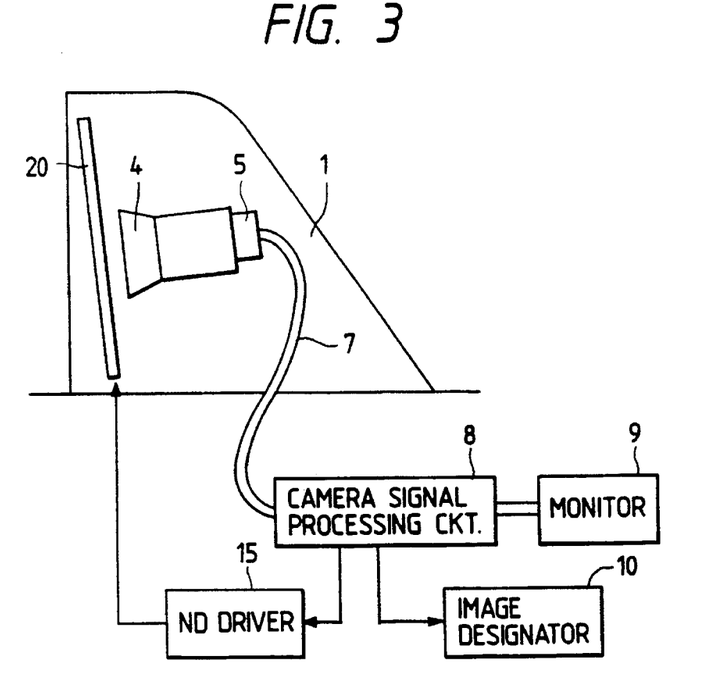
FIG. 3 is a schematic diagram showing an on-board monitor camera device according to the third embodiment of the present invention.

FIG. 3 shows the third embodiment of the present invention.

A difference in this embodiment from the first embodiment is that the half mirror 2 comprises an ND filter 20 whose transmittance can be varied by a voltage. The ND filter 20 is driven by a variable ND filter driver 15.

Since a vehicle travels outdoors, as a matter of course, the light amount with respect to the camera considerably changes depending on sunlight, headlights of other vehicles, and the like. For this reason, the video lens requires an aperture system having sufficient performance. As this system, of course, a system for driving an IG meter (aperture driving source) in the video lens according to the luminance component of a camera signal to open/close aperture blades and to adjust the transmission light amount may be adopted like in the prior art. In order to achieve a further compact structure, in this embodiment, a material such as an LCD (liquid crystal), EC (electrochrocy), or the like whose transmittance changes according to an applied voltage is used in the half mirror 2, and the output from the variable ND filter driver 15 is changed on the basis of the luminance signal, thereby adjusting the amount of light input to the lens 4.

Figure 4:
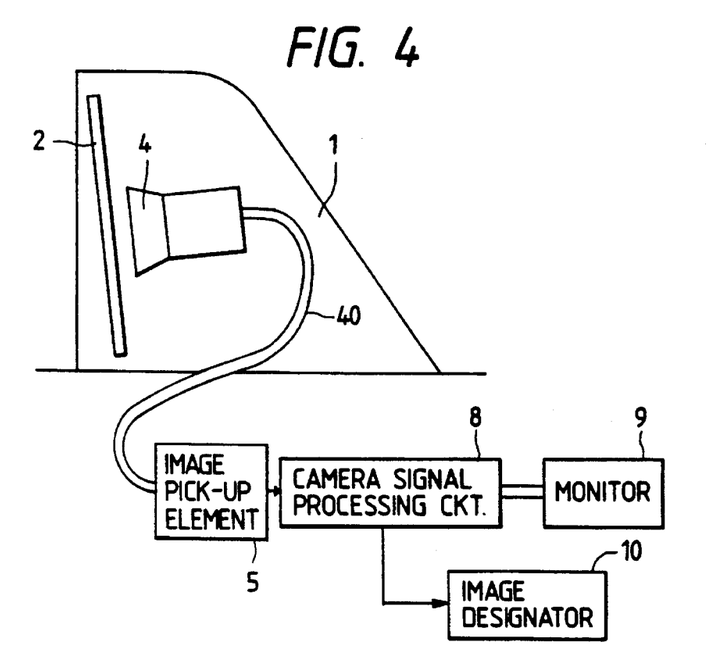
FIG. 4 is a schematic diagram showing an on-board monitor camera device according to the fourth embodiment of the present invention.

FIG. 4 shows the fourth embodiment of the present invention.

In this embodiment, an optical fiber 40 is used in place of the electrical signal transmission cable 7 in the first embodiment, the image pick-up element 5 is arranged at the end portion of the optical fiber 40, which extends into a passenger room, and light received by the video lens 4 is input to the image pick-up element 5 via the optical fiber 40. More specifically, the door mirror is required to have a more compact structure, and in order to meet this requirement, the image pick-up element and the lens are separately arranged in place of integrating them, and the image pick-up element is arranged in, e.g., a passenger room together with the camera signal processing circuit.

Figure 5:
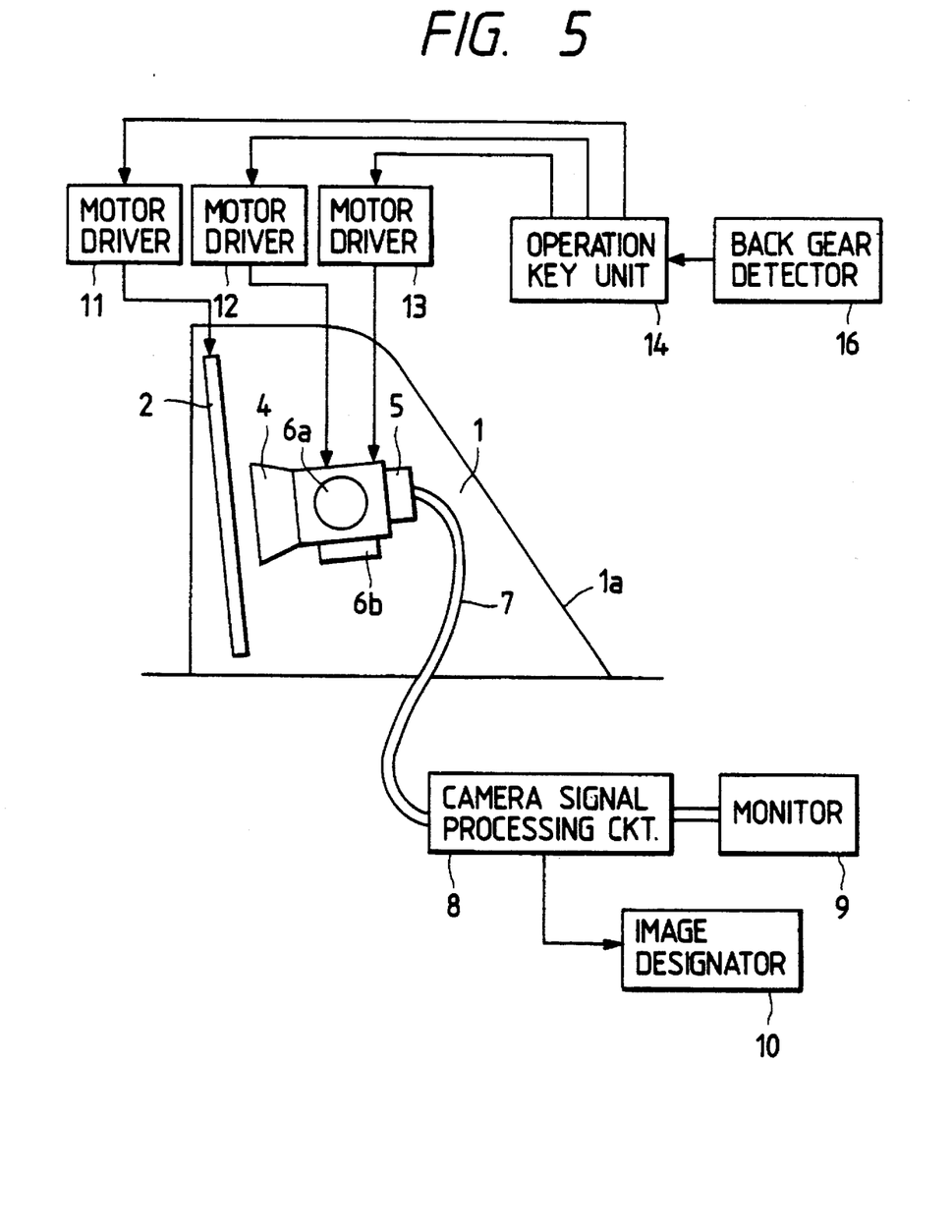
FIG. 5 is a schematic diagram showing an on-board monitor camera device according to the fifth embodiment of the present invention.

FIG. 5 shows the fifth embodiment of the present invention.

As the characteristic feature of this embodiment, a driving unit for rotating the video lens 4 in yaw and pitch directions is added to the first embodiment.

An device shown in FIG. 5 includes a yaw panhead driving unit 6a, a pitch panhead driving unit 6b, a motor driver 11 for driving a mirror angle changing motor (not shown), motor drivers 12 and 13 for driving the driving units 6a and 6b, and an operation key unit 14 for these drivers.

The mirror angle of the door mirror is changed to a corresponding easy-to-see position every time a driver is changed. Recently, many systems electrically attain this operation using operation keys in the passenger room in place of a manual operation. In this embodiment, in order to electrically perform this operation, the mirror angle changing motor (not shown) can be operated via the motor driver 11 by the operation key unit 14 arranged in the passenger room.

The drivers 12 and 13 are independently operated, and for example, the camera alone can be directed obliquely downward or upward. More specifically, when the vehicle is moved backward, since a lower view of the side rear views is important, the lens can be directed obliquely downward. When the vehicle travels on a bumpy road, the lens can be directed immediately downward to monitor the road condition.

Upon execution of the above-mentioned operation, the operation key unit 14 may be manually operated when the vehicle is moved backward. Alternatively, the camera may be automatically directed in a predetermined direction, e.g., a lower backward direction. Such an automatic mechanism will be described below.

A back gear detector 16 detects whether or not the gear of a transmission (not shown) of the vehicle is set at a back (reverse) gear position. When the back gear position is selected, the detector 16 supplies an ON signal to the operation key unit 14. In this automatic mechanism, a control circuit is provided to the operation key unit 14, and upon reception of a signal from the back gear detector 16, the control circuit outputs an operation signal for driving the drivers 12 and 13 in a predetermined direction (lower backward direction). Each panhead driving unit is provided with an encoder (not shown) for detecting the direction of the camera, and outputs a detection signal to the control circuit of the operation key unit 14.

Figure 8:
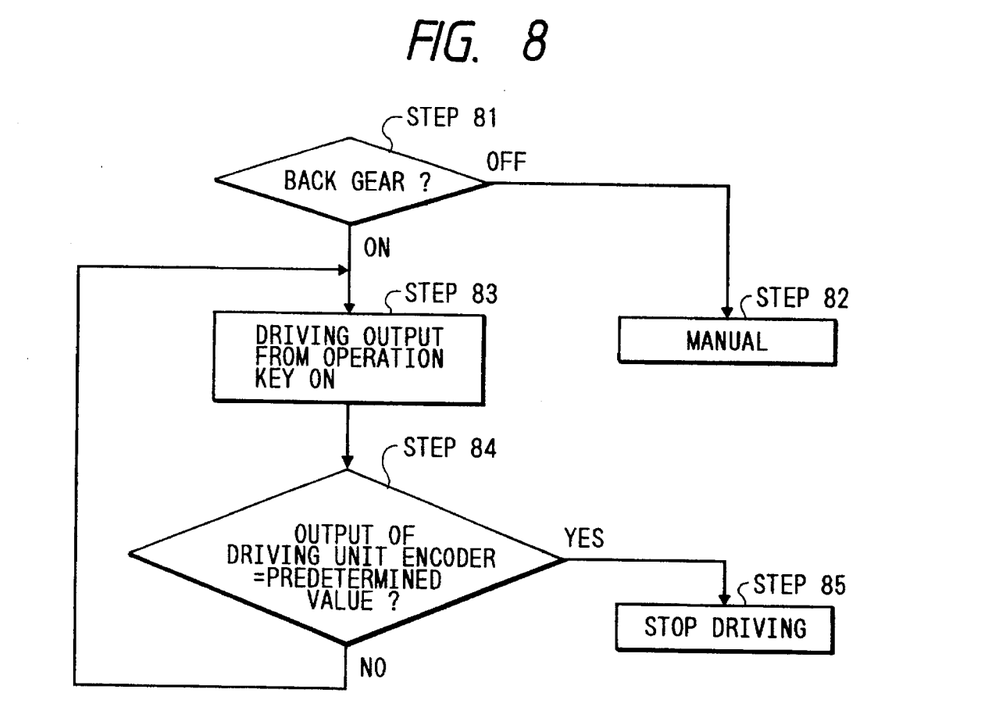
FIG. 8 is a flow chart for explaining an operation of the fifth embodiment.

The automatic driving operation with the above arrangement will be described below with reference to the flow chart shown in FIG. 8.

If it is determined in step 81 that the back gear detector 16 is OFF, i.e., the back gear position is not selected, a manual operation mode is set (step 82). On the other hand, if it is determined in step 81 that the back gear detector 16 is ON, i.e., the back gear position is selected, the operation key unit 14 is automatically operated to drive the driving units in a predetermined direction (step 83).

The driving units are automatically driven until the encoder output values that coincide with corresponding predetermined values (step 84), and after a coincidence is determined, the driving units are stopped (step 85). As a result, the camera is directed in a direction suitable for monitoring areas around the vehicle when the vehicle is moved backward.

When the camera lens is turned through 180° with respect to the mirror (i.e., is directed forward), the camera can be used as a front monitor camera. At this time, a mirror case portion 1a constituting the door mirror is also constituted by, e.g., a half mirror.

Figure 6:
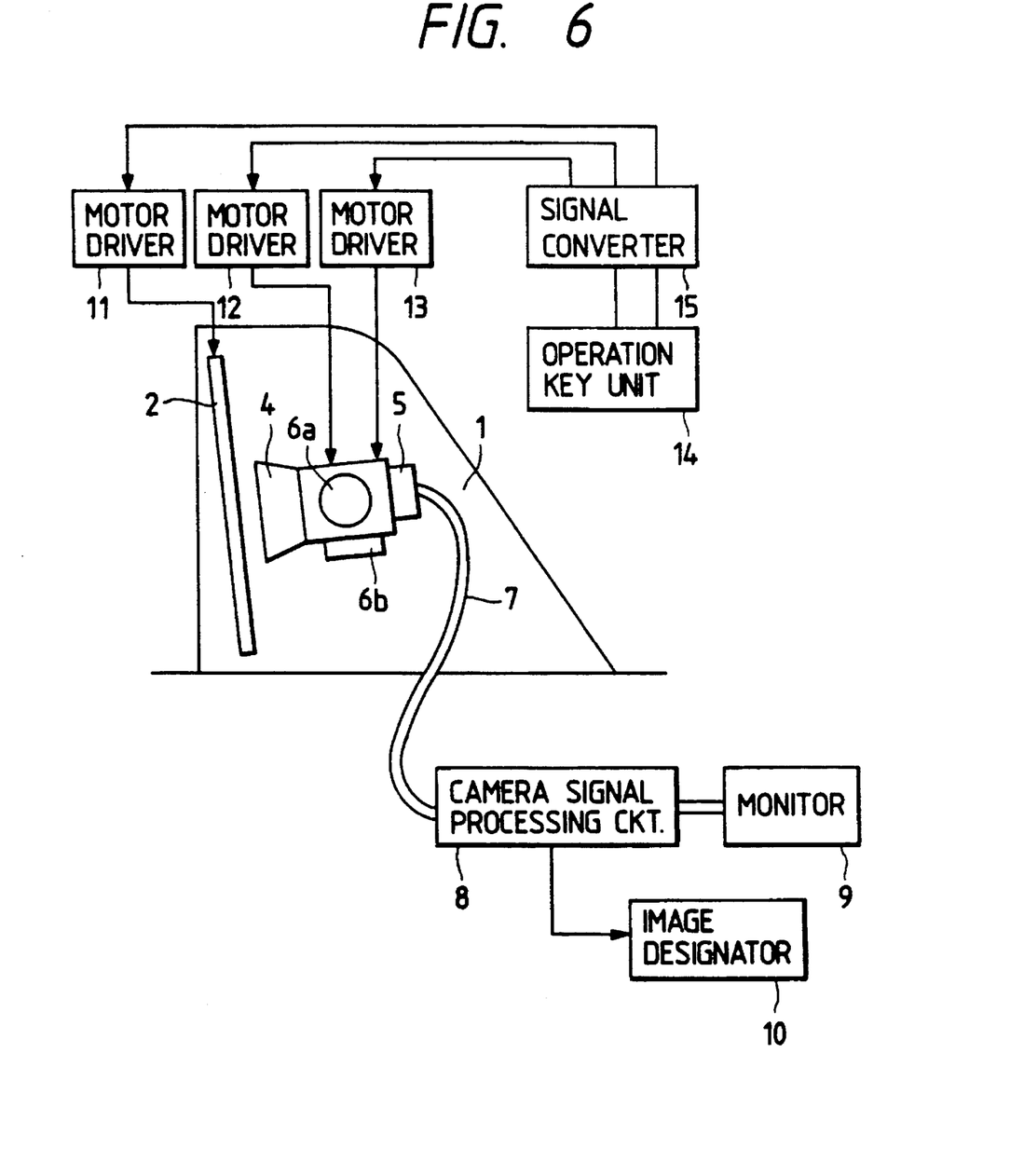
FIG. 6 is a schematic diagram showing an on-board monitor camera device according to the sixth embodiment of the present invention.

FIG. 6 shows the sixth embodiment of the present invention.

In this embodiment, the same signal is input to the yaw and pitch panhead units and the angle changing motor for the half mirror 2, so that the mirror and the camera are interlocked with each other while maintaining a predetermined relationship therebetween.

In addition to the arrangement of the fifth embodiment shown in FIG. 5, a signal converter 15, which supplies signals from the operation key unit 14 to the corresponding drivers 11 to 13, so that the mirror and the camera are interlocked with each other, is provided.

For example, when the mirror and the camera are set by the signal converter 15 so that the mirror surface of the half mirror 2 is substantially perpendicular to the camera optical axis, even if the mirror angle is changed by another driver, the same image as that observed by a current driver can be displayed on the monitor.

In each of the above embodiments, a lens or a combination of a lens with the an pick-up element is arranged in the door mirror of the vehicle. Alternatively, the lens, and the like may be arranged in a fender mirror.

The above embodiments may be properly combined.

As described above, according to the above embodiments, a video camera or a combination of a lens with an optical fiber is arranged in a mirror unit such as a door mirror, fender mirror, or the like of a vehicle, and image information around the vehicle is fetched via a mirror portion comprising a half mirror. Therefore, the camera, and the like can be protected from climatic effects, no problem of safety is posed since a mirror such as a door mirror, which complies with safety standards of vehicles, can be used, and the design or aerodynamics of the vehicle can be prevented from being impaired.

When the mirror portion is arranged to have a variable transmittance, the light amount guided to the image pick-up element can be adjusted, and the entire device can be rendered compact as compared to a case using a mechanical aperture device.

Furthermore, when an optical filter for a lens is provided to the mirror portion, or an image is guided to the image pick-up element via an optical fiber, the device can be further rendered compact.

Figure 9:
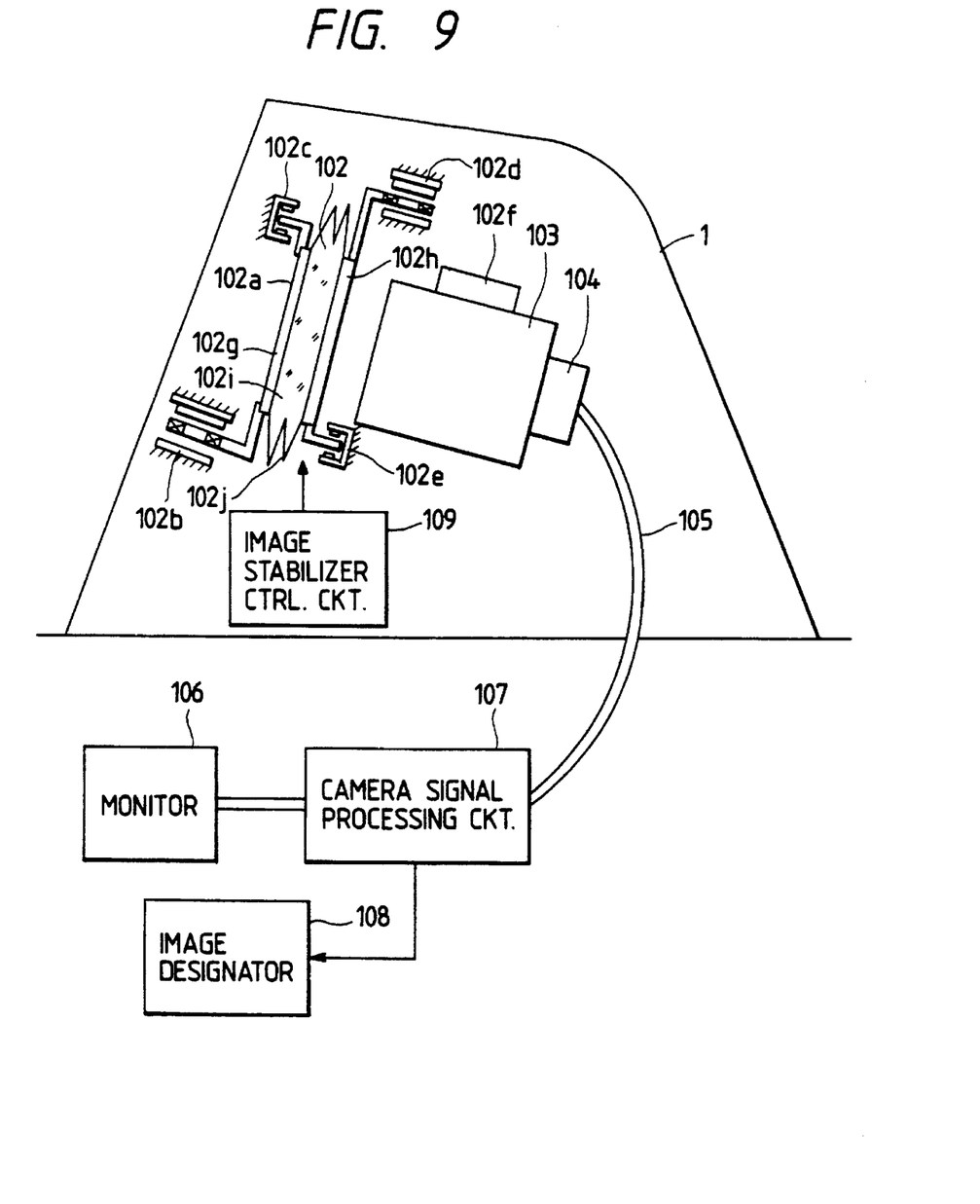
FIG. 9 is a schematic diagram showing an on-board camera device according to the seventh embodiment of the present invention.

FIG. 9 is a schematic diagram showing an on-board camera device according to the seventh embodiment of the present invention.

The on-board camera device of this embodiment is arranged in a door mirror 1 of a vehicle shown in FIG. 7.

The device shown in FIG. 9 includes a variable angle prism (to be abbreviated as a VAP hereinafter) 102 which also serves as a mirror portion of the door mirror 1, a video lens 103, and an image pick-up element 104 such as a CCD. The video lens 103 and the image pick-up element 104 are integrally assembled to constitute a video camera, and the video camera receives light transmitted through the VAP 102. A photoelectric conversion signal from the image pick-up element is output to a signal processing circuit 107 arranged in a passenger room via a signal transmission cable 105 of, e.g., a flexible printed circuit board, and a video output from the signal processing circuit 107 is output to a monitor 106 and an image designator 108. Note that the video camera is fixed to the door mirror 1.

The VAP 102 is constituted by sealing a liquid between opposing glass plates 102g and 102h, and varies an apex angle formed between the two glass plates 102g and 102h by moving the glass plates 102g and 102h. Since the operation principle of the VAP is known to those who are skilled in the art, a description thereof will be omitted.

The front-side glass plate 102g is formed as a half mirror by a coating layer 102a formed on its surface, and the glass plate 102h consists of a transparent glass. Therefore, the glass plate 102g provides a rear view to a driver in the same manner as a mirror portion of a normal door mirror. An optical image transmitted through the glass plate 102g is picked up by the video camera via the VAP 102. Thus, when the monitor 106 is placed at an easy-to-see position for the driver or a passenger, he or she can easily monitor side rear areas of the vehicle.

The glass plate 102g is driven by an actuator 102b, and the glass plate 102h is driven by an actuator 102d. The angle of the glass plate 102g is detected by a sensor 102c, and the angle of the glass plate 102h is detected by a sensor 102e. These actuators 102b and 102d and the sensors 102c and 102e are attached to the door mirror 1 via gimbal ring support mechanisms (to be described later). A vibration detection sensor 102f is attached to the video lens 103.

Figure 10:
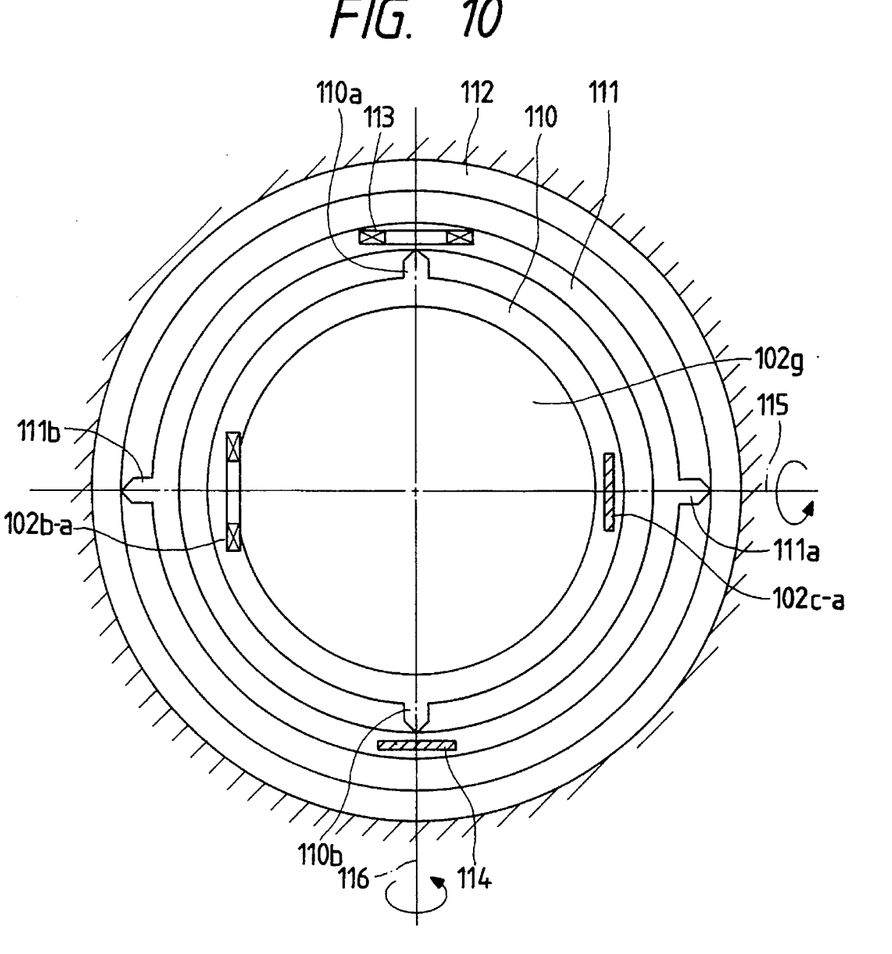
FIG. 10 is a plan view showing a support mechanism for a VAP.

The half mirror 102g and the glass plate 102h of the VAP 102 are supported by gimbal ring support mechanisms having the same structure. FIG. 10 shows the gimbal ring support mechanism for the half mirror 102g. Since the gimbal ring support mechanism for the glass plate 102h is the same as that shown in FIG. 10, a detailed description thereof will be omitted.

In FIG. 10, an angular inner ring member 110 holds the half mirror 102g, and has opposing pins 110a and 110b along an axis 116. These pins 110a and 110b allow the ring member 110 to be rotatable about the axis 116. A middle ring member 111 is arranged on the outer circumference of the inner ring member 110, and the pins 110a and 110b of the inner ring member 110 are axially supported by the middle ring member 111.

Pins 111a and 111b project from the middle ring member 111 along an axis 115 perpendicular to the axis 116. These pins 111a and 111b are axially supported by an outer ring member 112, so that the middle ring member 111 is rotatable about the axis 115. Note that the outer ring member 112 is attached to the door mirror 1.

The ring members 110 and 111 are respectively provided with coils 102b-a and 113 and slits 102c-a and 114, which respectively constitute actuators for applying torques about the axes 115 and 116, and sensors for detecting angular displacements about the axes 115 and 116.

The operation principles of the actuators and sensors will be described hereinafter with reference to FIG. 11 and FIGS. 12A and 12B.

Figure 11:
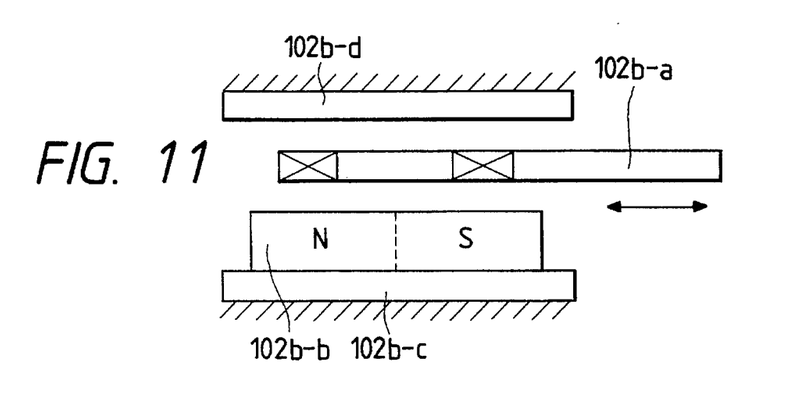
FIG. 11 is a view showing an actuator for the VAP.

FIG. 11 shows the operation principle of each actuator.

In FIG. 11, a magnet 102b-b, and yokes 102b-c and 102b-d are attached to a stationary portion of the door mirror 1. When the coil 102b-a attached to the inner ring member 110 is energized, an electromagnetic force is generated between the magnet 102b-b and the coil 102b-a, and the coil 102b-a can be moved in the direction of an arrow in FIG. 11. Thus, a torque, which can pivot the half mirror 102g about the axis 116 (FIG. 10), can be applied. As for the coil 113, a rotational torque about the axis 115 can be applied by the same actuator arrangement as described above.

Figure 12A:
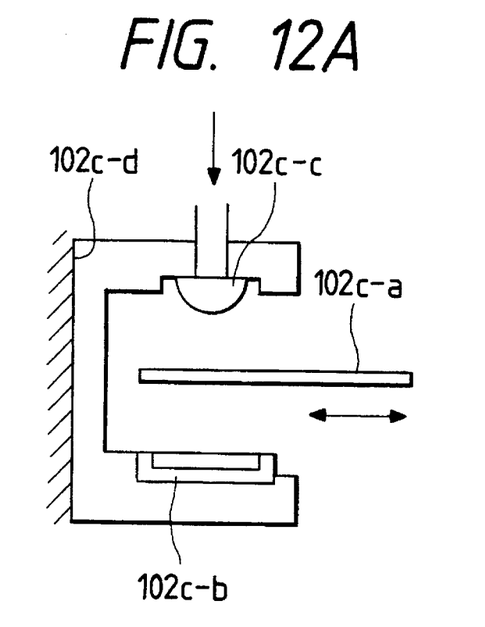
FIGS. 12A and 12B are views showing sensors for the VAP.
Figure 12B:
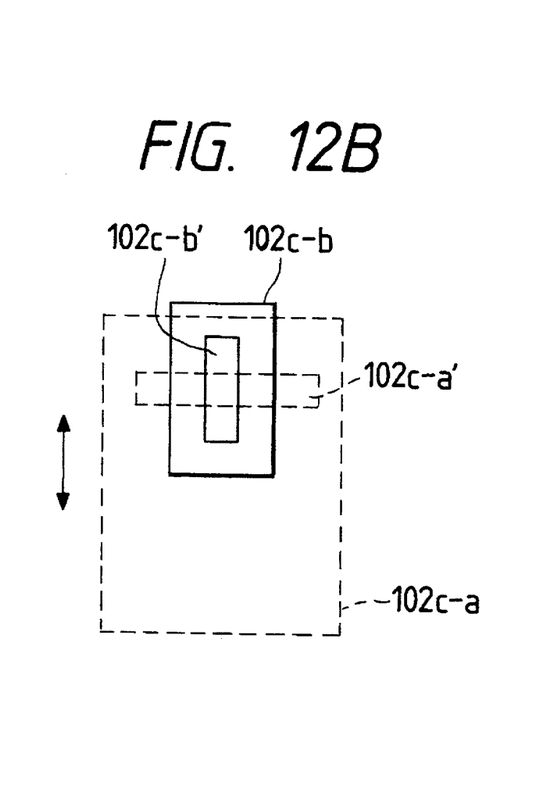

FIGS. 12A and 12B show the operation principle of each sensor.

A light-receiving element 102c-b such as a PSD and a light-emitting element 102c-c such as an iRed are held by a member 102c-d, which is attached to the stationary portion of the door mirror 1. As shown in FIG. 12B, the slit 102c-a is provided to the inner ring member 110, and is moved together with the inner ring member 110 in the direction of an arrow in FIG. 12B so as to change the light-receiving position of light, which is emitted from the light-emitting element 102c-c and is received by the light-receiving unit 102c-b, on a light-receiving surface 102c-b', thus detecting the displacement of the slit 102c-a. In this manner, the angular displacement of the inner ring member 110 can be detected. As for the slit 114, the angular displacement of the middle ring member 111 can be detected in the same manner as described above.

With the above arrangement, the half mirror 102g can realize a movement having degrees of freedom about two axes by a gimbal ring support mechanism. Also, the glass plate 102h can realize a movement having degrees of freedom about two axes by the same arrangement. Therefore, the half mirror 102g and the glass plate 102h can be independently moved.

Figure 13:
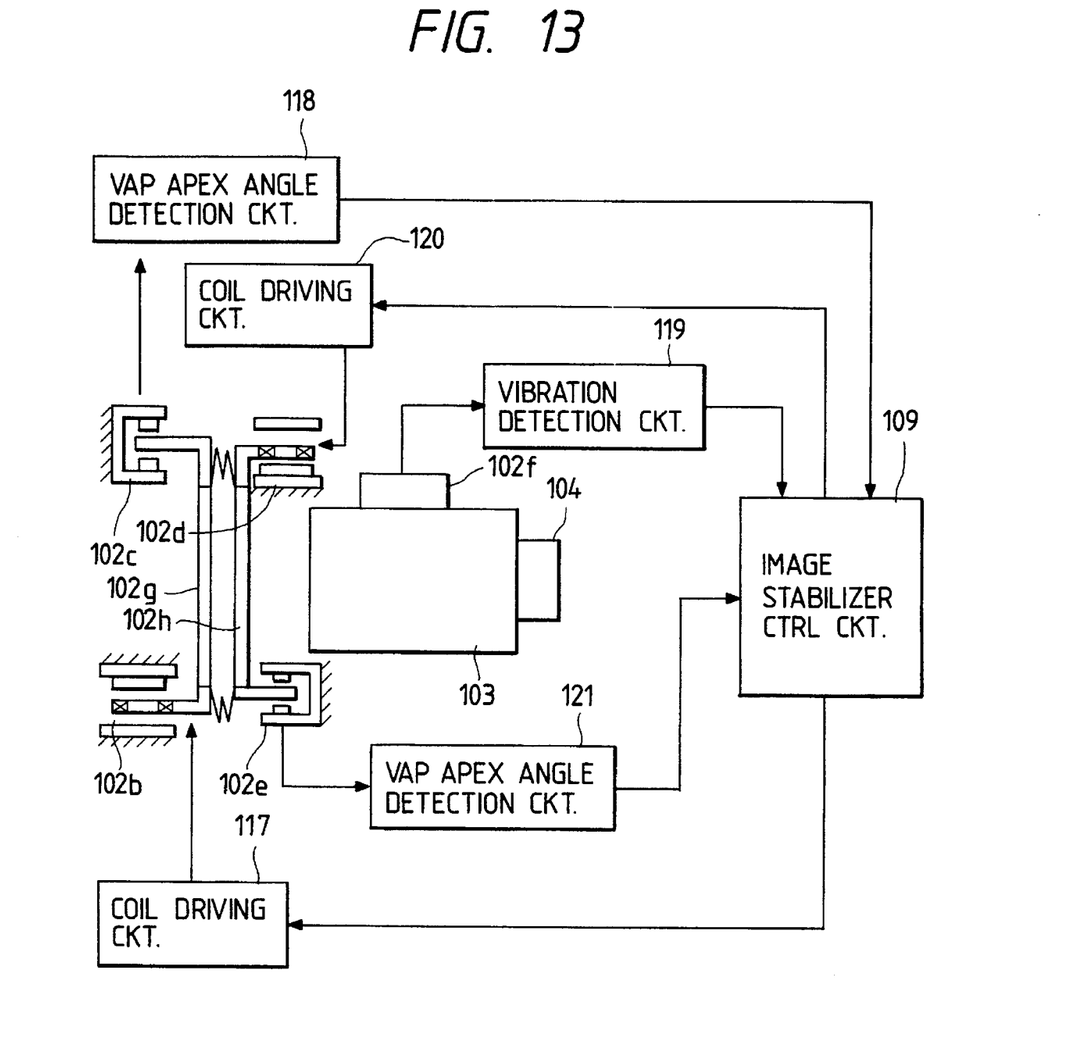
FIG. 13 is a block diagram showing a VAP driving circuit.

FIG. 13 is a block diagram of an image stabilizer circuit. Note that FIG. 13 explains an operation about only one axis. However, since an operation about the other axis is realized by the same arrangement, and these two operations are independently controlled, a detailed description of the operation about the other axis will be omitted.

Since the mirror portion on the front surface of the VAP 102 is the half mirror 102g, a driver checks safety of the vehicle by observing an image on the half mirror 102g. However, the vehicle is always vibrated according to a road state and traveling conditions, and an image formed on the half mirror is also vibrated and is not easy to see.

Therefore, this vibration is detected by a vibration detection sensor 102f and a vibration detection circuit 119. The detected signals and signals from the angle detection sensor 102c of the half mirror 102g, and a detection circuit 118 are compared by an image stabilizer control circuit 109, and the circuit 109 supplies displacement information according to the vibration to a coil driving circuit 117 so as to drive the half mirror 102g and the glass plate 102h, thus providing a stable image free from a vibration to the driver.

An image fetched by the video camera is also vibrated for the same reason as described above, and a displacement according to the vibration is similarly applied to the glass plate 102h, thus providing a stable image to the image pick-up element 104. Thus, various operations described in the prior art can be executed with high precision.

Figure 14A:
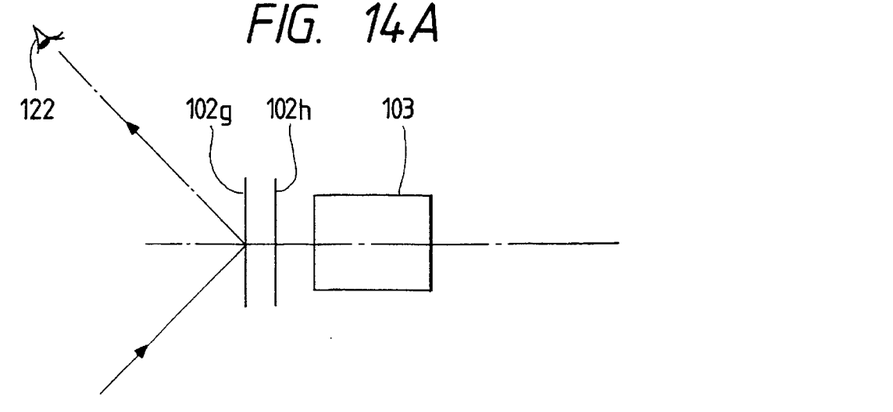
FIGS. 14A to 14C are views for explaining an operation of the VAP.
Figure 14B:
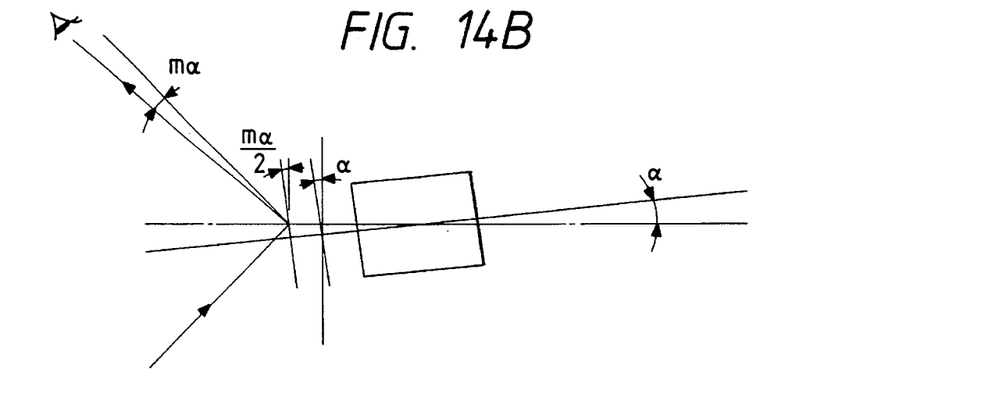
Figure 14C:
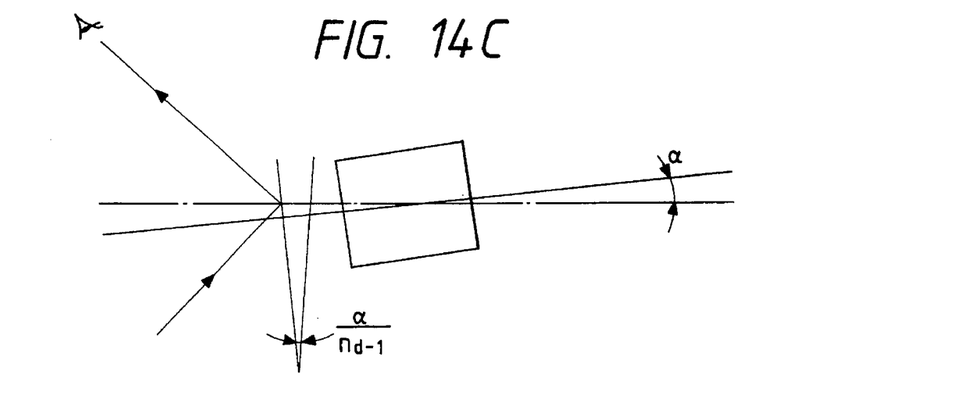

The details of the image stabilizing operation of the VAP 102 will be described below with reference to FIGS. 14A to 14C. FIGS. 14A to 14C show an operation about only one axis. Since the same operation is performed about the other axis, a detailed description thereof will be omitted.

FIG. 14A shows a state wherein no vibration occurs. A driver 122 obtains a rear view by the half mirror 102g. The video camera similarly obtains an image behind the vehicle.

A correction performed for the half mirror 102g when a vibration at an angle α occurs, as shown in FIGS. 14B and 14C, will be described below with reference to FIG. 14B.

When the entire vehicle is vibrated at the angle α, the driver 122 is also vibrated at a certain angle, as a matter of course. If the driver is completely fixed to the vehicle, he or she is similarly vibrated at the angle α. However, in practice, since the driver 122 has a degree of freedom with respect to the vehicle, the deviation angle of the driver is not the same as α. For this reason, assume that the gazing line of the driver is vibrated by an angle (mα) obtained by weighting α (where m is a constant determined by specifications of each vehicle since it varies depending on the positional relationship between the vehicle and the mirror).

When the gazing line of the driver is vibrated by ms, the mirror is inclined by mα/2 with respect to the position shown in FIG. 14A, so that the driver 122 can observe the same object at an identical position in the field of view. Therefore, a stable image can be obtained by inclining the half mirror 102g by mα/2 in the same direction as that of the vibration α. In practice, since the VAP 102 is inclined by α in the same direction as the camera before it is driven, the half mirror is driven in a direction (clockwise in FIG. 14C) opposite to the vibration direction by (α-mα/2).

The image stabilizing operation for the video camera will be described below with reference to FIG. 14C.

If the apex angle of the VAP 102 is represented by ε, and the refractive index of the liquid sealed in the VAP is represented by nd, α=ε(nd−1) is satisfied with respect to the inclination α of the optical axis. Therefore, when the vibration α occurs, the apex angle of the VAP 102 can be given by ε=α/(nd−1). In other words, when the vehicle is vibrated at the angle α, if the apex angle of the VAP 102 satisfies ε=α/(nd−1), the video camera can obtain a stable image free from the vibration.

From the above description, the actual driving angle of the glass plate 102h is (α/(nd−1)− mα/2+ α), and when the glass plate 102h is driven by (α/(nd− 1)− mα/2+α) in a direction opposite to the vibration direction, a stable image free from the vibration can be provided to the video camera.

Figure 15:
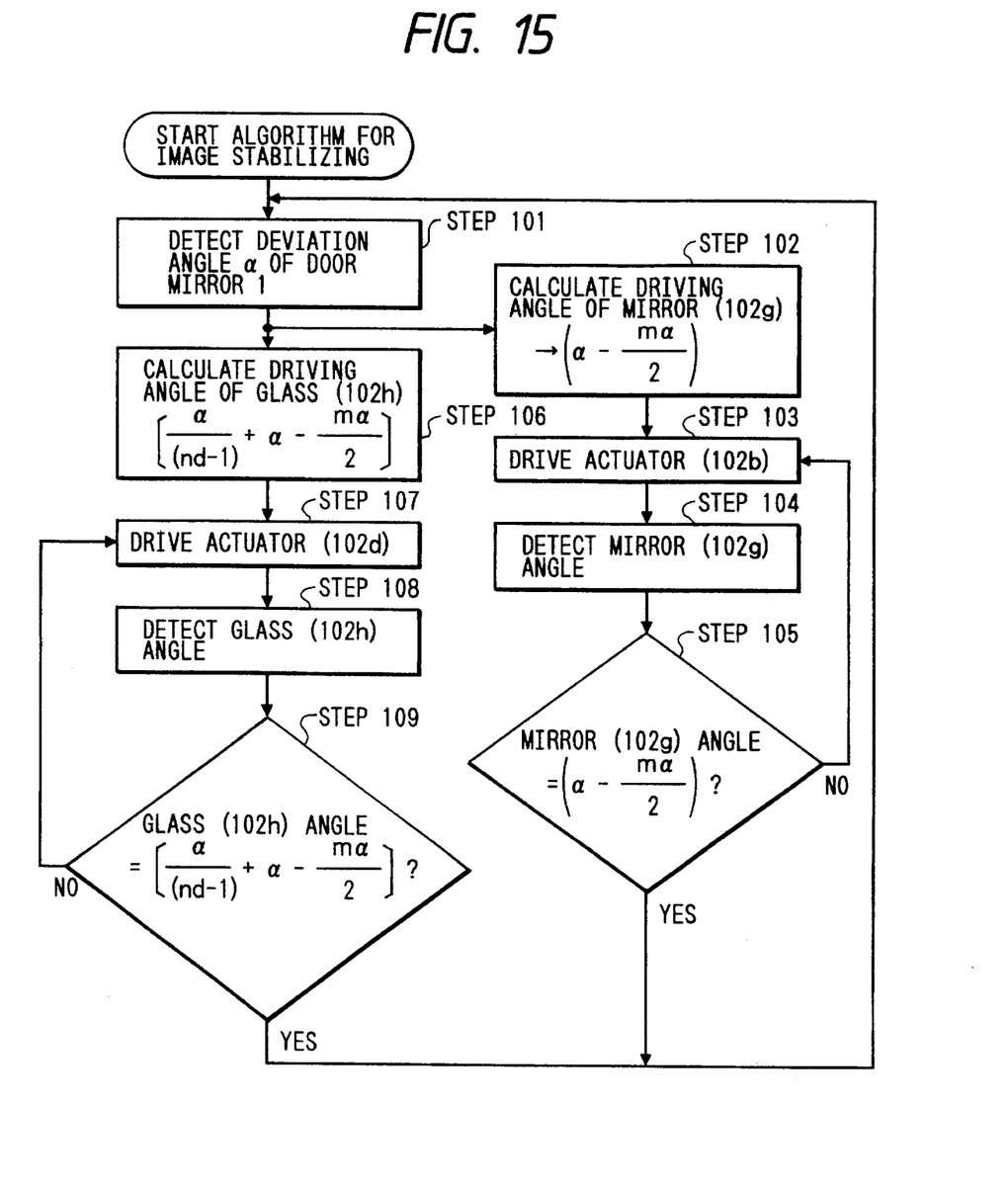
FIG. 15 is a flow chart for explaining an image stabilizing operation of the seventh embodiment.

FIG. 15 is a flow chart of the above-mentioned image stabilizing operation. The operation will be described below.

Step 101: The deviation angle of the door mirror 1 is detected. More specifically, the output from the vibration detection sensor 102f substantially fixed to the door mirror 1 is amplified by the vibration detection circuit 119, and the amplified output is supplied to the image stabilizer control circuit 109.

Step 102: The driving angle (α−mα/2) of the half mirror 102g is calculated based on the deviation angle α output in step 101, and an instruction signal is supplied to the coil driving circuit 117.

Step 103: The coil 102b-a is energized according to the signal output from the image stabilizer circuit 109.

Step 104: The angular displacement of the driven half mirror 102g, i.e., the output from the VAP apex angle sensor 102c is amplified by the VAP apex angle detection circuit 118, and the amplified output is supplied to the image stabilizer control circuit 109.

Step 105: The half mirror 102g is kept driven until the angular displacement of the half mirror 102g reaches (α−mα/2) on the basis of the signal from the VAP apex angle detection circuit 118, and when the angular displacement reaches (α− mα/2), the flow returns to step 101.

Step 106: The driving angle of the glass plate 102h is calculated by [α/(nd−1)+ α− mα/2] on the basis of the door mirror deviation angle α calculated in step 101, and an instruction signal is output to a coil driving circuit 120.

Step 107: The coil 102d-a is energized according to the signal output from the image stabilizer control circuit 109.

Step 108: The angular displacement of the driven glass plate 102h, i.e., the output from the VAP apex angle sensor 102e is amplified by a VAP apex angle detection circuit 121, and the amplified output is supplied to the image stabilizer control circuit 109.

Step 109: The glass plate 102h is kept driven until the angular displacement of the glass plate 102h reaches [α/(nd−1)+α−mα/2] on the basis of the signal from the VAP apex angle detection circuit 118, and when the angular displacement reaches [α/(nd−1)+ α− mα/2], the flow returns to step 101.

Upon repetition of steps 101 to 109 described above, the image stabilizing operation can be satisfactorily performed.

As described above, according to the above embodiment, the optical path is displaced according to the vibration of the vehicle, and the image pick-up means can pick up an image free from the vibration.

In particular, since the mirror unit of the vehicle such as a door mirror, a fender mirror, or the like is utilized, protection against climatic effects and safety of the vehicle can be guaranteed, and design or aerodynamics can be prevented from being impaired.

Furthermore, since the optical means such as the VAP also serves as the mirror portion of the mirror unit, an image directly observed by the driver through the half mirror can have the same state as that of an image picked up by the image pick-up means.

What is claimed is:

1. A camera device for use with a vehicle having a view mirror unit, said camera device comprising:
   the view mirror unit, coupled to the vehicle, and comprising a half-mirror for reflecting light to an occupant of the vehicle;
   image pick-up means, coupled to the vehicle, for receiving light transmitted through said half mirror; and
   an optical filter, connected to or integral with said half mirror, for filtering light passing through said half mirror.

2. A device according to claim 1, wherein said image pick-up means comprises a photographing lens and an image pick-up element, said photographing lens and said image pick-up element being coupled to the view mirror unit.

3. A device according to claim 1, wherein said image pick-up means comprises a photographing lens and an image pick-up element, said photographing lens being coupled to the view mirror mounting unit, coupled to the moving body, and further comprising a light transmission member for optically coupling said photographing lens and said image pick-up element.

4. A device according to claim 3, wherein said light transmission member comprises an optical fiber.

5. A device according to claim 1, wherein said half mirror includes a variable transmittance filter.

6. A device according to claim 1, wherein said image pick-up means comprises a photographing lens, said photographing lens being movable to vary a light-receiving range.

7. A device according to claim 1, further comprising a mirror angle changing mechanism, coupled to the view mirror unit, for rotating said half mirror.

8. A device according to claim 7, wherein said mirror angle changing mechanism independently rotates said half mirror in two orthogonal directions.

9. A device according to claim 6, further comprising a mirror angle changing mechanism, coupled to the view mirror unit, for rotating said half mirror.

10. A device according to claim 9, further comprising interlocking means for interlocking the movement of said photographing lens with rotation of said half mirror.

11. A device according to claim 1, wherein said half mirror comprises a rear view mirror of said vehicle.

12. A device according to claim 11, wherein said image pick-up means comprises a photographing lens and an image pick-up element, said photographing lens and said image pick-up element being coupled to said vehicle rear view mirror.

13. A device according to claim 11, wherein said image pick-up means comprises a photographing lens and an image pick-up element, said photographing lens being coupled to said vehicle rear view mirror, said image pick-up element being coupled to said vehicle, and further comprising a light transmission member for optically coupling said photographing lens and said image pick-up element.

14. A device according to claim 11, wherein said image pick-up means comprises a photographing lens, said photographing lens being movable to vary a light-receiving range.

15. A device according to claim 11, further comprising a mirror angle changing mechanism, coupled to said view mirror unit, for rotating said half mirror.

16. A device according to claim 15, wherein said mirror angle changing mechanism independently rotates said half mirror in two orthogonal directions.

17. A device according to claim 14, further comprising a mirror angle changing mechanism, coupled to said view mirror unit, for rotating said half mirror.

18. A device according to claim 17, further comprising interlocking means for interlocking the movement of said photographing lens with rotation of said half mirror.

19. A camera device for use with a vehicle having a view mirror unit, said camera device comprising:
   the view mirror unit, coupled to said vehicle, and comprising a half mirror for reflecting light to an occupant of the vehicle;
   image pick-up means, coupled to the vehicle, for receiving light transmitted through said half mirror;
   an optical filter, connected to or integral with said half mirror, for filtering light passing through said half mirror;
   a mirror angle changing mechanism, coupled to the view mirror unit, for rotating said half mirror;
   blur detection means, coupled to said image pick-up means, for detecting a blur of light received by said image pick-up means; and
   means for driving said mirror angle changing mechanism on the basis of an output from said blur detection means.

20. A camera device for use with a vehicle having a view mirror unit, said camera device comprising:
   optical means, coupled to said view mirror unit and having two opposing planar optical members, for deflecting an incident optical axis by moving said pair of opposing planar optical members relative to each other;
   driving means, coupled to said optical means, for relatively moving said opposing planar optical members; and image pick-up means, coupled to said vehicle, for receiving light transmitted through said optical means.

21. A device according to claim 20, wherein at least one of said planar optical members comprises a half mirror.

22. A device according to claim 20, further comprising means for independently moving said pair of planar optical members in two orthogonal directions.

23. A device according to claim 21, further comprising means for independently moving said pair of planar optical members in two orthogonal directions.

24. A device according to claim 20, further comprising:
   blur detection means, coupled to said image pick-up means, for detecting a blur in the light received by said image pick-up means, and
   wherein said driving means drives said optical members on the basis of an output from said blur detection means.

25. A device according to claim 22, further comprising at least one gimbal ring support mechanism for relatively moving said pair of planar optical members.

26. A device according to claim 20, wherein one of said pair of planar optical members comprises a rear view mirror of said vehicle.

27. A device according to claim 26, wherein at least one of said planar optical members comprises a half mirror.

28. A device according to claim 26, further comprising:

blur detection means, coupled to said image pick-up means, for detecting a blur in the light received by said image pick-up means, and wherein said driving means drives said optical members on the basis of an output from said blur detection means.

29. A view mirror device for a vehicle, comprising:

an angularly displaceable mirror coupled to the vehicle, said mirror comprising a pair of opposing planar optical members;

blur detection means, coupled to the vehicle, for detecting a blur in light incident on said mirror;

driving means, coupled to the vehicle, for causing the angular displacement of said mirror on the basis of an output from said blur detection means; and means for relatively moving said planar optical members of said mirror to vary an apex angle thereof.

30. A device according to claim 29, wherein said driving means angularly displaces the mirror to correct a deviation angle of a line of sight of an observer present on the vehicle on the basis of deviation angle information detected by said blur detection means.

31. A device according to claim 29, further comprising means for providing independent angular displacement of said mirror in two orthogonal directions.

32. A device according to claim 29, wherein said mirror comprises a rear view mirror of said vehicle.

33. A device according to claim 32, wherein said driving means angularly displaces said mirror to correct a deviation angle of a gazing line of an observer present in the vehicle on the basis of deviation angle information detected by said blur detection means.

34. A device according to claim 32, further comprising means for providing independent angular displacement of said mirror in two orthogonal directions.

35. Camera apparatus for use with an automotive vehicle having a rear view mirror, comprising:

said rear view mirror comprising a half-mirror, light reflected therefrom being visible to an occupant of the vehicle;

a lens disposed adjacent said half-mirror, for receiving light passing through the half-mirror; and image pickup means, optically coupled to said lens, for receiving light passing through said lens and forming an image signal corresponding to the light received by the image pickup means.

36. A camera for use with a vehicle-mounted side rear view mirror comprising:

a half-mirror mounted on a side of said vehicle for reflecting light incident thereon to an occupant in the vehicle;

a lens mounted on the side of the vehicle adjacent the half-mirror, for receiving light passing through the half-mirror; and an image pickup means optically coupled to said lens, for forming an image signal corresponding to the received light.

* * * * *

UNITED STATES PATENT AND TRADEMARK OFFICE
CERTIFICATE OF CORRECTION

PATENT NO. : 5,523,811
DATED : June 4, 1996
INVENTOR(S) : HIROYUKI WADA, ET AL.

It is certified that error appears in the above-indentified patent and that said Letters Patent is hereby corrected as shown below:

On the title page:

<u>Column [56] RC</u>,
    line FPD, "1265400 10/1989 Japan" should read --1-265400 10/1989 Japan--.

<u>Column 3</u>,
    line 35, "(electrochrocy)" should read --electrochromatic--; and
    line 60, "An" should read --A--.

<u>Column 5</u>,
    line 11, the an" should read --a--.

<u>Column 9</u>,
    line 31, "mounting" should be deleted.

<u>Column 10</u>,
    line 44, "and image" should read --and (begin new paragraph) image--.

Signed and Sealed this

Twenty-second Day of October, 1996

*Attest:*

BRUCE LEHMAN

*Attesting Officer*      *Commissioner of Patents and Trademarks*